(12) United States Patent
Kampe et al.

(10) Patent No.: US 8,861,165 B2
(45) Date of Patent: Oct. 14, 2014

(54) STRENGTHENING ELEMENT FOR A MOUNTING FLANGE OF A HOLLOW CYLINDRICAL INSULATOR HOUSING

(71) Applicants: Anders Kampe, Borlange (SE); Daniel Johansson, Grangesberg (SE); Kerstin Ekeroth Reijm, Borlange (SE)

(72) Inventors: Anders Kampe, Borlange (SE); Daniel Johansson, Grangesberg (SE); Kerstin Ekeroth Reijm, Borlange (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/084,215

(22) Filed: Nov. 19, 2013

(65) Prior Publication Data
US 2014/0078634 A1    Mar. 20, 2014

Related U.S. Application Data

(63) Continuation of application No. PCT/EP2012/060334, filed on Jun. 1, 2012.

(60) Provisional application No. 61/494,992, filed on Jun. 9, 2011.

(51) Int. Cl.
| | |
|---|---|
| *H01C 7/12* | (2006.01) |
| *H01B 17/26* | (2006.01) |
| *H05K 5/00* | (2006.01) |
| *H01B 17/00* | (2006.01) |
| *H01B 17/38* | (2006.01) |
| *H01C 1/14* | (2006.01) |
| *H02H 9/04* | (2006.01) |
| *H01B 17/16* | (2006.01) |
| *H01B 17/66* | (2006.01) |
| *H01B 17/32* | (2006.01) |
| *H01B 17/36* | (2006.01) |

(52) U.S. Cl.
CPC ............... *H01B 17/66* (2013.01); *H01B 17/38* (2013.01); *H01C 1/14* (2013.01); *H02H 9/044* (2013.01); *H01C 7/12* (2013.01); *H01B 17/325* (2013.01); *H01B 17/16* (2013.01); *H01B 17/36* (2013.01)
USPC ........... 361/118; 174/142; 174/18; 174/158 R

(58) Field of Classification Search
USPC .......................... 361/118; 174/142, 18, 158 R
See application file for complete search history.

(56) References Cited

U.S. PATENT DOCUMENTS

| | | | | | |
|---|---|---|---|---|---|
| 1,304,283 | A | * | 5/1919 | Eby | ................................ 174/18 |
| 1,873,977 | A | * | 8/1932 | Naef | ............................. 361/270 |

(Continued)

FOREIGN PATENT DOCUMENTS

| | | |
|---|---|---|
| CH | 154921 A | 5/1932 |
| CN | 201788722 U | 4/2011 |

(Continued)

OTHER PUBLICATIONS

International Preliminary Report on Patentability Application No. PCT/EP2012/060334 Completed: Aug. 21, 2013 18 pages.

(Continued)

*Primary Examiner* — Scott Bauer
(74) *Attorney, Agent, or Firm* — St. Onge Steward Johnston & Reens LLC

(57) ABSTRACT

An insulator housing suitable for electrical products for high voltage, for example, surge arresters, breakers or bushings. The insulator housing includes a first cylindrical end and a second cylindrical end having a hollow insulator body. The first end and/or second end is provided with a cylindrical flange for attaching the insulator housing to an external device at a first end of the flange. A strengthening element is arranged at a second end of the flange.

15 Claims, 4 Drawing Sheets

(56) References Cited

U.S. PATENT DOCUMENTS

| | | | |
|---|---|---|---|
| 3,028,568 A | * | 4/1962 | Camilli .......................... 336/70 |
| 3,962,667 A | * | 6/1976 | Link ............................. 337/202 |
| 4,965,407 A | * | 10/1990 | Hamm ......................... 174/31 R |
| 4,965,409 A | * | 10/1990 | Lindroos ....................... 174/658 |

FOREIGN PATENT DOCUMENTS

| | | |
|---|---|---|
| DE | 102005051576 A1 | 4/2007 |
| EP | 0195990 A2 | 10/1986 |
| EP | 0283897 A2 | 9/1988 |
| EP | 0449536 A1 | 10/1991 |
| GB | 360059 A | 11/1931 |
| GB | 421590 A | 12/1934 |
| GB | 463965 A | 4/1937 |

OTHER PUBLICATIONS

International Search Report and Written Opinion of the International Searching Authority Application No. PCT/EP2012/060334 Completed: Aug. 17, 2012; Mailing Date: Aug. 29, 2012 9 pages.

Written Opinion of the International Preliminary Examining Authority Application No. PCT/EP2012/060334 Mailing Date: May 28, 2013 6 pages.

* cited by examiner

Section A-A

STRENGTHENING ELEMENT FOR A MOUNTING FLANGE OF A HOLLOW CYLINDRICAL INSULATOR HOUSING

FIELD OF THE INVENTION

The present invention relates to a strengthening element for an insulator housing comprising a hollow insulator body and at least one flange. The present invention also relates to an insulator housing comprising a strengthening element arranged at a flange of the insulator housing.

BACKGROUND OF THE INVENTION

An insulator housing comprises a hollow insulator body of an insulating material, for example, porcelain or a polymer composite, and at least one end of the insulator body is an metallic flange of, for example, steel or aluminium attached. The metallic flange can be attached to the hollow insulator body in different ways, for example, press fitting, crimping, gluing or cementing.

An insulator housing is used in a variety of electrical products for high voltage, for example, surge arresters, breakers or bushings.

The insulator housing is usually attached to an external device through the flange that is attached to at least one end of the insulator. The external device is, for example, an arrester base structure when the insulator housing is part of a surge arrester, a second insulator housing, or a transformer housing when the insulator housing is part of a bushing for a transformer. Depending on the design of the insulator housing and the load the insulator housing shall withstand, the number of bolts/fixing points to the external device can vary. FIG. 1 shows an example of an insulator housing according to prior art, being attached to an external device.

Sometimes the part of the flange where the flange is attached to the external device, such as second insulator housing or a base structure, is weakened during use due to mechanical overloading or cracks, such as frost cracks. It might then be the case that the flange will not be able to withstand the initially specified mechanical loads given by the manufacturer. This could be overcome by disassembly of the equipment comprising the insulator and exchange of the insulator housing with a damaged flange to a new insulator housing with undamaged flanges. However, this will be complicated, expensive and time consuming. It is therefore a need to find an alternative way to strengthen the insulator housing.

SUMMARY OF THE INVENTION

An object of the invention is to provide a strengthening element for an insulator housing. According to a first aspect there is presented an insulator housing with a first cylindrical end and a second cylindrical end having a hollow insulator body, which first end and/or second end is provided with a cylindrical flange for attaching the insulator housing to an external device at a first end of the flange, wherein at least one strengthening element is arranged at a second end of the flange.

According to embodiments the first end of the insulator housing is firmly arranged in the flange by press-fitting, crimping, gluing, cementing and/or adhesion.

According to embodiments the insulator housing further comprises cement arranged between the insulator body and the flange to keep a tight fit.

According to embodiments the strengthening element is provided such that part of the stress applied on the first end of the flange being closest to the external device is transmitted to the second end of the flange such that mechanical strength of the insulator housing thereby is increased.

According to embodiments the strengthening element is provided with bolts at fixing points, the bolts attaching the flange to the external device.

According to embodiments the bolts are tightened with a flexible component in series with the bolts.

According to embodiments the flexible component comprises tube sleeves or springs.

According to embodiments the flexible component is arranged such that force of a load applied at a first end of the flange is distributed between the fixing point and the second end of the flange.

According to embodiments the load distribution between the first end of the flange and the second end of the flange is determined by stiffness of the flexible component.

According to embodiments the strengthening element is provided as clamps attached to the external device with bolts through bores in the clamps and through bores arranged in the first end of the flange.

According to embodiments the strengthening element is provided as a ring attached to the external device with bolts through bores in the ring and through bores arranged in the first end of the flange.

According to embodiments the ring comprises at least two sections.

According to embodiments the at least two sections comprises attachment surfaces, and wherein the at least two sections are attached together at one of their at least two attachment surfaces.

According to embodiments the at least two sections b) are attached with a hinge at one of their attachment surfaces.

According to embodiments the at least two sections are attached by at least one bolt and nut at an attachment surface.

According to embodiments the at least two sections are attached by means of a puzzle hook at an attachment surface.

According to embodiments the at least two sections are attached by two socket head cap screws entering the ring from the circumference of the ring and through two sections.

According to embodiments the housing is a glass fibre reinforced epoxy hollow body comprising silicone shed.

According to a second aspect there is presented a surge arrester comprising at least two insulator housings according to the first aspect, the at least two insulator housings being arranged on top of one another.

Another object of the invention is to provide an insulator housing comprising a strengthening element. According to a third aspect there is presented a strengthening element for an insulator housing, the insulator housing having a first cylindrical end and a second cylindrical end, which first end and/or second end is provided with a cylindrical flange for attaching the insulator housing to an external device at a first end of the flange, wherein the strengthening element is adapted to apply a pressure on a second end of the flange such that the stress on the first end of the flange is reduced.

It is to be noted that any feature of the first, second and third aspects may be applied to any other aspect, wherever appropriate. Likewise, any advantage of the first aspect may equally apply to the second, and/or third aspect, respectively, and vice versa. Other objectives, features and advantages of the enclosed embodiments will be apparent from the following detailed disclosure, as well as from the drawings.

Generally, all terms used in the claims are to be interpreted according to their ordinary meaning in the technical field, unless explicitly defined otherwise herein. All references to "a/an/the/said element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be explained in greater detail by description of exemplary embodiments and with reference to the accompanying drawing, wherein:

FIG. 2B schematically shows the embodiment in FIG. 2a from a different view, partly in cross-section A-A of FIG. 2a;

FIG. 3B schematically shows the embodiment in FIG. 3a from a different view, partly in cross-section B-B of FIG. 3a;

FIG. 4B shows an alternative embodiment of the attachment arrangement shown if FIG. 4a;

FIG. 4C shows an alternative embodiment of the attachment arrangement shown in FIG. 4a; and FIG. 4D shows an alternative embodiment of the attachment arrangement shown in FIG. 4a.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
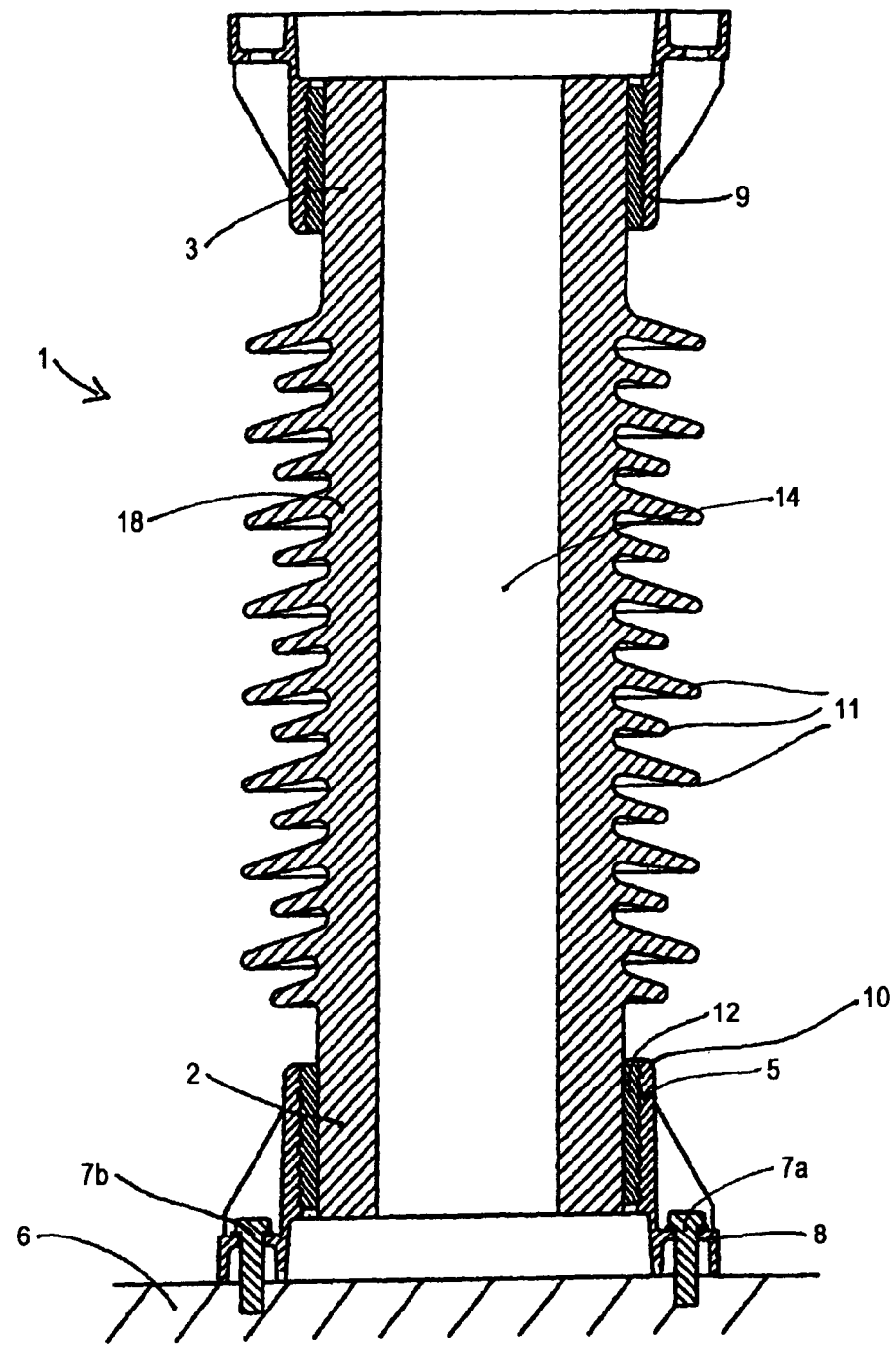
FIG. 1 shows in a cross-sectional view an insulator housing according to prior art.

FIG. 1 shows in a cross-sectional view an insulator housing 1 for a surge arrester according to prior art. The insulator housing 1 comprises an insulator body 18 with a hollow interior 4, the insulator body has two open ends, a first end 2 and a second end 3. The insulator body 18 usually has a cylindrical shape and is provided with a series of protruding sheds 11 on its outer surface. The insulator body 18 is preferably rigid and is, for example, made of porcelain, polymer or a polymer composite such as an epoxy tube with sheds of a polymer, such as silicone. Particularly, the insulator body 18 is preferably a glass fibre reinforced epoxy hollow body with silicone sheds. The first end 2 of the insulator body 18 is provided with a first flange 5, and the second end 3 of the insulator body 18 is provided with a second flange 9. The first flange is provided with through bores at a first end 8 of the first flange 5 for attaching the insulator housing 1 to an external device 6 with at least one fastener 7a, 7b, arranged at the first end 8 of the first flange 5. The fastener is, for example, a bolt with a nut, or a screw. The first end 2 of the insulator housing is firmly arranged in the first flange 5 by, for example, press-fitting, crimping, gluing, cementing and/or adhesion. In FIG. 1, cement 12 is arranged between the insulator body 18 and the flange 5 to keep a tight fit. When the insulator housing is used in a surge arrester, varistor blocks and end electrodes are arranged in the hollow interior 4. In a surge arrester several insulator housings 1 can be arranged on top of one another.

Figure 2A:
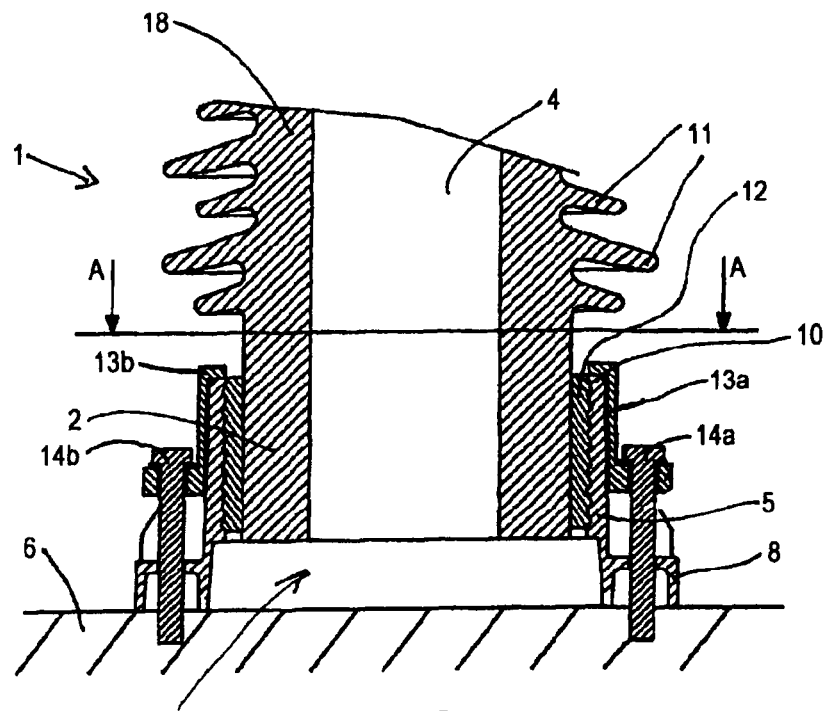
FIG. 2a shows in a cross-sectional view a part of an insulator housing according to an embodiment of the invention.

FIG. 2a shows in a cross-sectional view a part of an insulator housing 1 according to an exemplary embodiment of the invention where the difference compared to FIG. 1 is that the first flange 5 of the insulator housing 1 has been provided with at least one strengthening element arranged at a second end 10 of the flange 5. The strengthening element is in the form of a clamp 13a-d attached to the external device 6 with bolts 14a-14d through bores in the clamps and through bores arranged in the first end 8 of the flange 5. Thereby part of the stress normally applied on the first end 8 of the flange 5, i.e. the end of the flange that is closest to the external device 6, is transmitted to the second end 10 of the flange. When the clamps 13a-13d are attached to an insulator housing 1 already in use, the clamps can be attached one at the time and the existing bolts exchanged to longer bolts one at the time. Thereby an easy repair and improved mechanical strength of an insulator housing already in use is achieved.

Figure 2B:
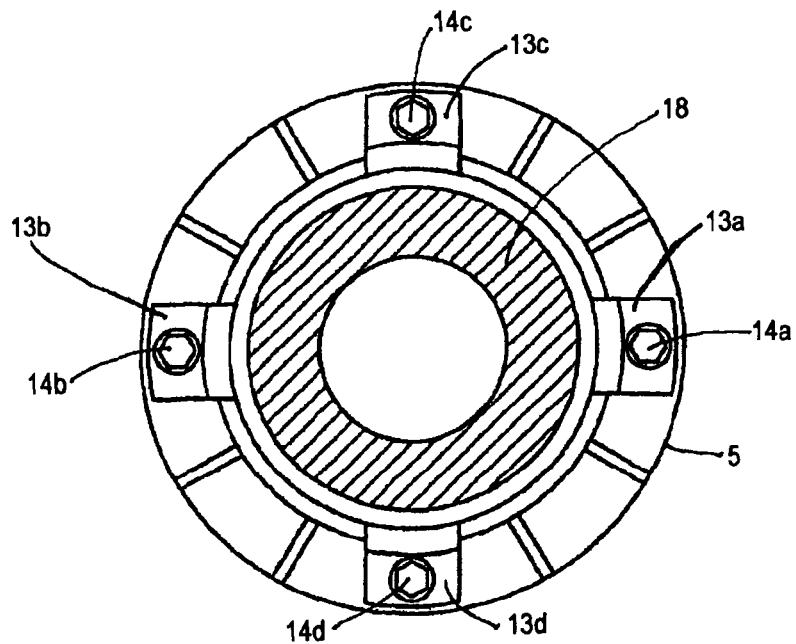

FIG. 2b schematically shows the embodiment in FIG. 2a from a different view where four clamps 13a-d are attached to the first flange 5 with one bolt 14a-d through a bore in each clamp and through a bore in the flange to the external device. Also, the cross-section A-A in FIG. 2 of the insulator body 18 is shown.

Figure 3A:
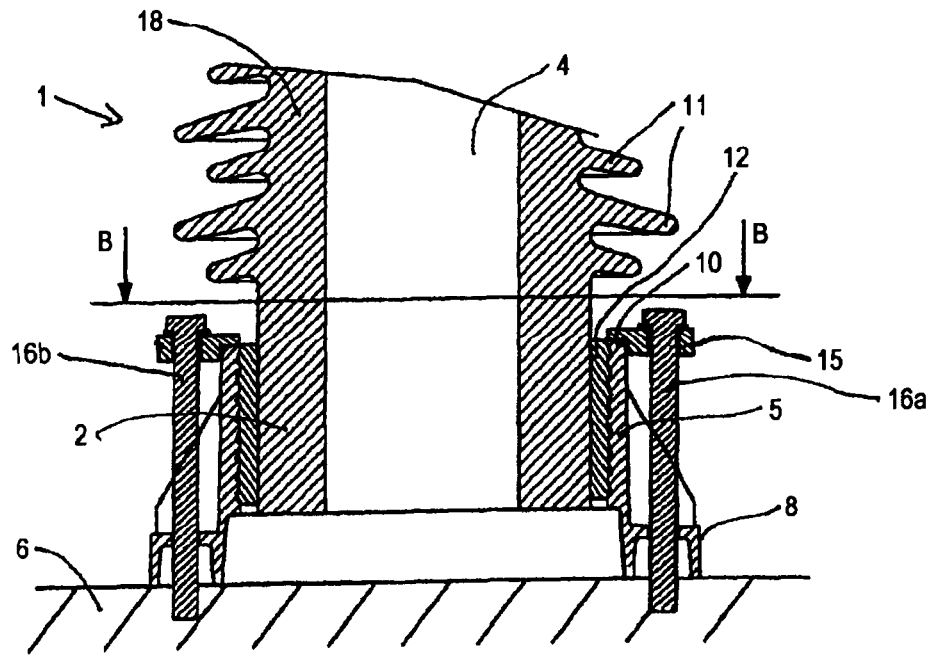
FIG. 3A shows in a cross-sectional view a part of an insulator housing according to an alternative embodiment of the invention.
Figure 3B:
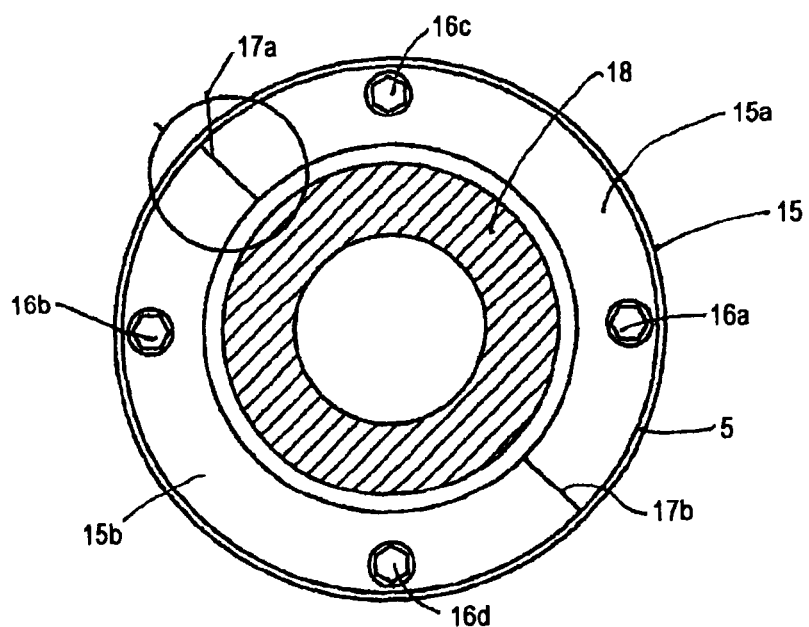

FIG. 3a shows in a cross-sectional view a part of an insulator housing 1 according to an exemplary embodiment of the invention where the difference compared to FIG. 1 is that the first flange 5 of the insulator housing 1 has been provided with at least one strengthening element arranged at a second end 10 of the flange 5. The strengthening element is in the form of a ring 15 attached to the external device 6 with bolts 16a-16d through bores in the ring and through bores arranged in the first end 8 of the flange 5. Thereby part of the stress applied on the first end 8 of the flange 5, i.e. the end of the flange that is closest to the external device 6, is transmitted to the second end 10 of the flange and the mechanical strength of the insulator housing 1 is increased. When the ring 5 is attached to an insulator housing already in use, the ring is preferably split in at least two sections 15a, 15b as shown in FIG. 3b. This will facilitate mounting on an insulator housing already in use. Thereby an easy repair and improved mechanical strength of an insulator housing in use is achieved.

FIG. 3b schematically shows the embodiment of the invention in FIG. 3a from a different view where the ring comprises a first section 15a and a second section 15b attached together at an attachment surface 17a,b. The ring sections 15a, 15b are attached to the first flange 5 with at least one bolt 16a-d through a bore in each ring section 15a, 15b and a through a bore in the flange to the external device. Also, the cross-section B-B in FIG. 3a of the insulator body 18 is shown.

When a ring 15 is used as a strengthening element according to the exemplary embodiment of the invention shown in FIGS. 3a and 3b the tensile stress from the bolts are distributed at a larger section of the flange compared to when a single clamp at each bolt is used as shown in the exemplary embodiment of the invention in FIGS. 2a and 2b. When no strengthening element is used as shown in FIG. 1 the major part of the tensile stresses will be present at the first end of the flange where the bolts are attached.

When a clamp or ring according to the above exemplary embodiments are used as a strengthening element the originally fixing point, i.e. where flange is attached to the external device with bolts, of the insulator housing could be tightened with tube sleeves, springs or another component (not shown) in series with the bolt. In this way the load can be distributed between the original fixing point and the second end of the flange. The load distribution between the original fixing points (first end of flange) and the second end of the flange where the strengthening device attaches, could be determined by the stiffness of the flexible component (tube sleeves, springs, etc.).

Figure 4A:
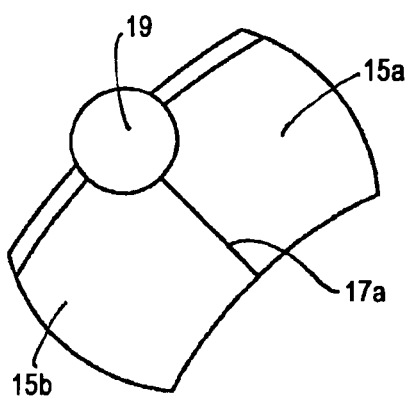
FIG. 4A shows an attachment arrangement for two segments of a ring shaped strengthening element according to one embodiment of the invention.
Figure 4B:
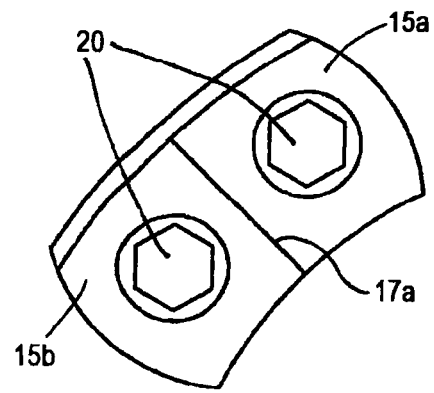
Figure 4C:
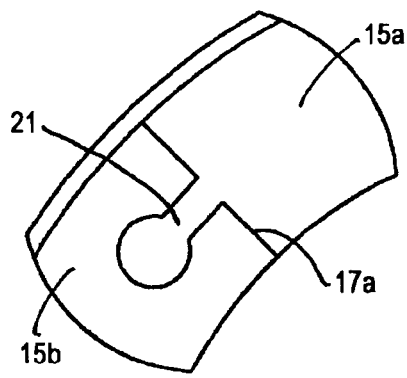
Figure 4D:
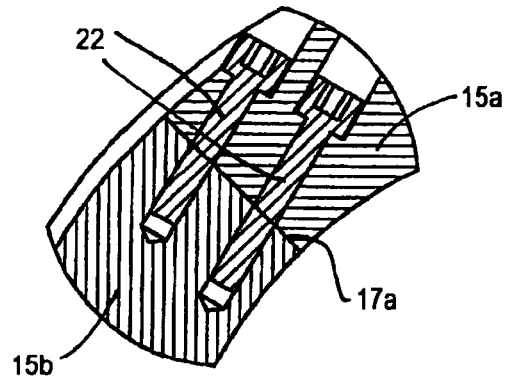

FIGS. 4a-4d shows various examples of how the at least two ring segments 15a, 15b in FIG. 3b could be attached together at one of their at least two attachment surfaces 17a, 17b. FIG. 4a shows that the ring segments 15a, 15b are attached with a hinge 19 at one of their attachment surfaces 17a. FIG. 4b shows that the ring segments 15a, 15b are attached by making an overlapping attachments surface and use at least one bolt 20 and nut to keep the at least two ring segments 15a, 15b together. FIG. 4c shows that the ring segments 15a, 15b are attached by making a "puzzle" hook 21 at the attachment surface 17. The hook between the two ring segments could of course have any suitable configuration as long as the ring segments are kept together. For example, each ring segment could be equipped with edges at the attachments surface that hook the ring sections together. FIG. 4d shows how the at least two ring segments 15a, 15b are attached by two socket head cap screws entering the ring from the circumference of the ring and through the two ring segments 15a, 15b. It would of course also be possible to let the socket head cap screw enter from the surface defining the hole of ring. If there are two socket head cap screws holding the two segments together, one of the screws could enter the ring from the circumference of one of the ring sections 15a, cross the attachment surface, and enter the other ring section 15b, and the other screw could enter the ring from the circumference from the other ring section 15b, cross the attachment surface and enter the first ring section 15a. Thereby the ring sections are secured to each other.

The flange 5 in FIGS. 1-3 is, for example, made of aluminium or steel.

The clamps 13a-d, ring 5 or segment of rings 5a, 5b is, for example, aluminium, steel, stainless steel or a composite material. However, any material having the required properties to withstand the required force could be used as long as it would be suitable to manufacture the ring or clamps of the material.

By using clamps 13a-d, a ring or ring segments 15a, 15b the tensile stresses normally present at the first end 8 of the flange at the fixing points can be reduced and instead the flange 5 will be subject to a compression stress, since the fixing bolts 14a-d, 16a-d holds the flange at its top. Thereby the prospective breaking load of the flanges will be increased.

Also, by using clamps, a ring or segments of a ring as a strengthening element the insulator housings may be repaired at site without being removed from its installed position. This is a great advantage as it gives the opportunity to have a simple and quick repair without the need of a full disassembly of the insulator housing. Another advantage is that the cost of the repair is reduced compared to if the insulator housing must be disassembled to repair it. An additional advantage is that by attaching the clamps, ring or segments of ring to a standard insulator housing the declared mechanical data of this insulator housing could be increased without redesigning the flanges.

The invention is not limited to the embodiments shown above, but the person skilled in the art may, of course, modify them in a plurality of ways within the scope of the invention as defined by the claims. Thus, the invention is not limited to insulator housings used in surge arresters, but may also be applied to, for example, insulator housings used in breakers and bushings. Also, the strengthening elements may of course be used when several insulator housings are arranged on top of one another, for example in a surge arrester built from several insulator housings. The strengthening elements may then be used at all flanges, or only at selected flanges being subject to more stress than other flanges.

What is claimed is:

1. An insulator housing with a first cylindrical end and a second cylindrical end having a hollow insulator body, which first end and/or second end is provided with a cylindrical flange for attaching the insulator housing to an external device at a first end of the flange, which flange is provided with through bores at the first end thereof for attaching the insulator housing to the external device with at least one bolt arranged at the first end of the flange, characterised in that at least one strengthening element provided as clamps or a ring comprising at least two sections is arranged at a second end of the flange, said strengthening element being attachable to the external device with bolts through bores in the strengthening element and through the bores arranged in the first end of the flange, whereby an easy repair and an improved mechanical strength of an insulator housing which is already in use can be achieved.

2. The insulator housing according to claim 1, wherein the first end of the insulator housing is firmly arranged in the flange by press-fitting, crimping, gluing, cementing and/or adhesion.

3. The insulator housing according to claim 1, further comprising cement arranged between the insulator body and the flange to keep a tight fit.

4. The insulator housing according to claim 1, wherein the strengthening element is provided such that part of the stress applied on the first end of the flange being closest to the external device is transmitted to the second end of the flange such that mechanical strength of the insulator housing thereby is increased.

5. The insulator housing according to claim 1, wherein the strengthening element is provided with bolts at fixing points, the bolts attaching the flange to the external device.

6. The insulator housing according to claim 5, wherein the bolts are tightened with a flexible component in series with the bolts.

7. The insulator housing according to claim 6, wherein the flexible component comprises tube sleeves or springs.

8. The insulator housing according to claim 6, wherein the flexible component is arranged such that force of a load applied at a first end of the flange is distributed between the fixing point and the second end of the flange.

9. The insulator housing according to claim 8, wherein the load distribution between the first end of the flange and the second end of the flange, is determined by stiffness of the flexible component.

10. The insulator housing according to claim 1, wherein the at least two sections comprises attachment surfaces, and wherein the at least two sections are attached together at one of their at least two attachment surfaces.

11. The insulator housing according to claim 1, wherein the at least two sections are attached with a hinge at one of their attachment surfaces.

12. The insulator housing according to claim 1, wherein the at least two sections are attached by at least one bolt and nut at an attachment surface.

13. The insulator housing according to claim 1, wherein the at least two sections are attached by two socket head cap screws entering the ring from the circumference of the ring and through two sections.

14. The insulator housing according to claim 1, wherein the housing is a glass fibre reinforced epoxy hollow body comprising silicone sheds.

15. A surge arrester comprising at least two insulator housings according to claim 1, the at least two insulator housings being arranged on top of one another.

\* \* \* \* \*